(12) United States Patent
Van Adrichem et al.

(10) Patent No.: US 11,876,789 B2
(45) Date of Patent: Jan. 16, 2024

(54) ENCRYPTED DATA COMMUNICATION AND GATEWAY DEVICE FOR ENCRYPTED DATA COMMUNICATION

(71) Applicant: Nederlandse Organisatie voor toegepast-natuurwetenschappelijk onderzoek TNO, The Hague (NL)

(72) Inventors: Nicolaas Leonardus Maria Van Adrichem, Rotterdam (NL); Maran Paula Petronella Van Heesch, Utrecht (NL); Piotr Wojciech Zuraniewski, Rijswijk (NL); Jeffrey Jermain Panneman, The Hague (NL)

(73) Assignee: Nederlandse Organisatie voor toegepast-natuurwetenschappelijk onderzoek TNO, The Hague (NL)

( * ) Notice: Subject to any disclaimer, the term of this patent is extended or adjusted under 35 U.S.C. 154(b) by 129 days.

(21) Appl. No.: 17/613,441

(22) PCT Filed: May 25, 2020

(86) PCT No.: PCT/NL2020/050335
§ 371 (c)(1),
(2) Date: Nov. 22, 2021

(87) PCT Pub. No.: WO2020/242301
PCT Pub. Date: Dec. 3, 2020

(65) Prior Publication Data
US 2022/0311753 A1    Sep. 29, 2022

(30) Foreign Application Priority Data
May 24, 2019 (EP) .................................... 19176557

(51) Int. Cl.
*H04L 29/06* (2006.01)
*H04L 9/40* (2022.01)
*H04L 9/32* (2006.01)

(52) U.S. Cl.
CPC ........ *H04L 63/0471* (2013.01); *H04L 9/3263* (2013.01); *H04L 2209/76* (2013.01)

(58) Field of Classification Search
CPC ............... H04L 63/0471; H04L 9/3263; H04L 2209/76
See application file for complete search history.

(56) References Cited

U.S. PATENT DOCUMENTS 5,623,600 A * 4/1997 Ji .............................. H04L 9/40
726/24
2007/0204145 A1* 8/2007 Bunn .................. H04L 63/0281
713/152

(Continued)

FOREIGN PATENT DOCUMENTS

CN    104022947 A    9/2014
CN    106921674 A    7/2017

OTHER PUBLICATIONS

European Patent Office, International Search Report in corresponding International Application No. PCT/NL2020/050335, dated Aug. 6, 2020 (2 pages).

*Primary Examiner* — Evans Desrosiers
(74) *Attorney, Agent, or Firm* — Leydig, Voit & Mayer, Ltd.

(57) ABSTRACT

A gateway device between a first and second communication network outside the gateway device handles communication between a first device in the first network and a second device in the second network. When the gateway receives a communication request from the first device, directed to the second device, for performing a first cryptographic data communication protocol, the gateway determines whether the first cryptographic data communication protocol is reg- (Continued)

istered as unsafe in the gateway device, and/or registered as safe, in particular whether it is safe against key reconstruction by a quantum computer. When the first cryptographic data communication protocol is not registered as unsafe in the gateway device, and/or registered as safe, the gateway device forwards messages exchanged as part of execution of the first cryptographic data communication protocol between the first and second device. When the gateway determines that the first cryptographic data communication protocol is registered as unsafe in the gateway device, and/or not registered as safe, the gateway device executes the first cryptographic data communication protocol between the first device and the gateway device, and executes a second cryptographic data communication protocol, which is not recorded as unsafe in the gateway device, and/or registered as safe, between the gateway and the second device, whereby the first and second cryptographic data communication protocol are executed sequentially to communicate data between the first and second device via the gateway device.

12 Claims, 5 Drawing Sheets

(56) References Cited

U.S. PATENT DOCUMENTS

| | | |
|---|---|---|
| 2007/0263658 A1 | 11/2007 | Ung et al. |
| 2019/0116035 A1 | 4/2019 | Mustafa et al. |

* cited by examiner

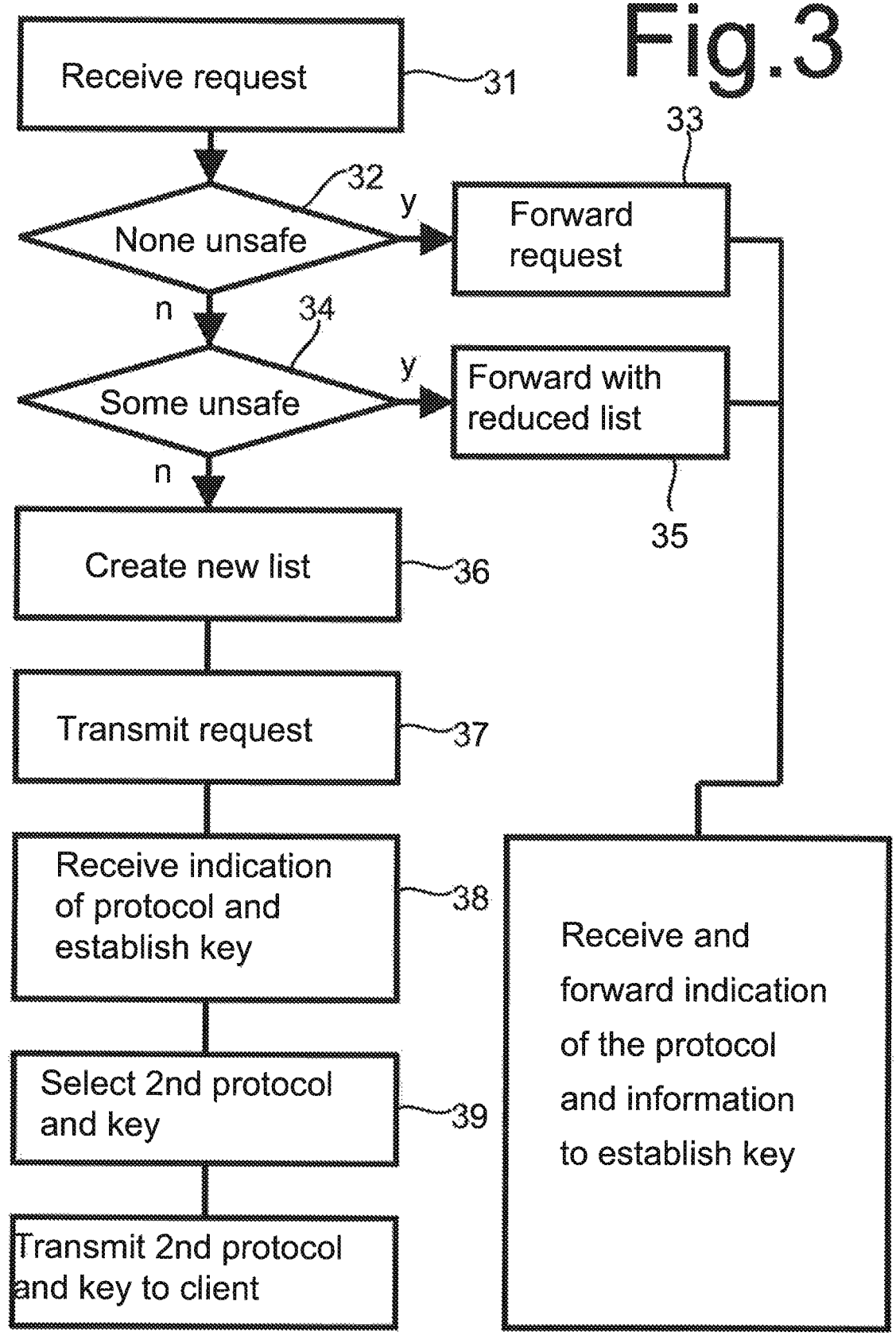

ENCRYPTED DATA COMMUNICATION AND GATEWAY DEVICE FOR ENCRYPTED DATA COMMUNICATION

CROSS-REFERENCE TO RELATED APPLICATIONS

This patent application is a U.S. National Phase of PCT International Application No. PCT/NL2020/050335, filed May 25, 2020, which claims priority to European Application No. 19176557.7, filed May 24, 2019, which are both expressly incorporated by reference in their entireties, including any references contained therein.

FIELD OF THE INVENTION

The invention relates to encrypted data communication, to a gateway device for use in encrypted data communication and to a system of gateway device for use in encrypted data communication.

BACKGROUND

Encrypted data communication is well known. When a transmitting device executes a command to transmit data, such as a message, a file or a stream, it applies the steps of an encryption scheme to the data, or uses a version of the data to which such steps have been applied, and transmits the encrypted data over a medium like the Internet. A receiving device receives the encrypted data from the medium and applies the steps of a decryption scheme using secret information in the form of a decryption key, or stores the data for later decryption. Together, the encryption scheme and the decryption scheme will be referred to as a cryptographic data communication protocol.

Many cryptographic data communication protocols use cryptographic keys that can in theory be computed from information that is provided in plain form in the communication, such as in the form of a public encryption key, and where the encrypted data that can relatively easily be decrypted when the cryptographic decryption key is provided, but where, without knowledge of the decryption key, the decryption is much more complex. These encryption/decryption schemes are designed so that conceivable computation of the decryption key is so complex that the time needed to execute such a computation increases excessively with key size.

One example are asymmetric RSA cryptographic data communication protocol wherein decryption involves raising an encrypted data word in the form of a number to a power k modulo N, where k is a number used as a secret key that can be computed given N and k', wherein k' is a number used as a public encryption key. In theory, decryption can be performed by computing k from given values of N and k', by determining the two prime factors that make up N. But when N is sufficiently increased this computation takes an excessively increasing number of steps.

With the development of quantum computers, part of the known cryptographic protocols will become unsafe, in the sense that it will become possible to decrypt data that has been encrypted using such schemes without advance knowledge of the secret key information within a manageable amount of time. This affects mainly asymmetric cryptographic protocols that use different keys for encryption and decryption.

For example, because quantum computers support new methods of decomposing a number of increasing size into a product of a pair of prime numbers in a manageable amount of computing time (e.g. Shor's algorithm), the described asymmetric RSA encryption scheme is not safe because the secret key k can be computed without needing a prohibitive amount of time. More generally any cryptographic data communication protocol that is based on prime factorization is quantum unsafe.

Similarly, cryptographic data communication protocols that include the Diffie-Hellman protocol to obtain a cryptographic key, and more generally any cryptographic data communication protocol that is based on the time needed to solve discrete logarithm problems is quantum unsafe. As is known per se, the Diffie-Helman protocol involves the computation of a cryptographic key by steps of raising base numbers to powers of secret numbers, modulo a prime number p. The cryptographic key can be determined without knowing the secret numbers by solving discrete logarithm problems. However, when p is sufficiently large this takes a prohibitive amount of time to execute using classic (non-quantum) computers. Quantum computing also enables computation of solutions of discrete logarithm problems in a manageable amount of time, thus rendering Diffie-Helman protocol unsafe.

Fortunately, quantum safe cryptographic data communication protocols are also known, that is, cryptographic data communication protocols for which complex decryption techniques that do require the secret key information do not become manageable when a quantum computer is used.

Examples of cryptographic data communication protocols that are currently considered to be quantum safe are summarized in: https://csrc.nist.gov/Projects/Post-Quantum-Cryptography/Round-2-Submissions. In general terms there are five main categories of asymmetric quantum safe cryptographic data communication protocols: code based cryptography, lattice-based cryptography, hash-based cryptography, multivariate cryptography and cryptography based on super-singular isogenies. Many symmetric encryption schemes, such as AES256 are considered to be quantum safe. However, most present day computers use cryptographic data communication protocols that are quantum unsafe, and even though cryptographic data communication protocols will be updated in the future, it is likely that many computers that use quantum unsafe cryptographic data communication protocols will remain in use. Even though no suitable quantum computers are yet available, use of quantum safe protocols is currently desirable to avoid that currently transmitted message can be stored and decrypted once quantum computers become available.

US2007204145 discloses a security network server that provides network management services. A source host specifies a connection security level. In response the security network server creates a receiving process and a forwarding process for forwarding to the destination host, both in advance of communication. The security network server serves as a filtering router and supports management of filtering rule sets from remote hosts.

The security network server allows: interconnection of single-level hosts and networks that operate at different levels, including one-way transfer of data from a lower security enclave to higher security level hosts and networks, as well as one-way transfer of data from a higher security enclave to lower security level hosts or networks, based on a predefined downgrade rule set. Thus the security network server, configured as a high-assurance guard, can be used to exchange information between enclaves at different security classification levels.

US2007263658 transforms data formats of protocol standards of different network enclaves. The transformation occurs transparently in a guard server. A protocol standard may define a security level. For this, the transport and application layers may support encryption of the data.

SUMMARY

Among others, it is an object to provide for improved protection against unauthorized decryption of data.

A method is provided that is executed by a gateway device between a first and second communication network outside the gateway device, for handling communication between a first device in the first network and a second device in the second network. The method comprises
- receiving a communication request from the first device, directed to the second device, for performing a first cryptographic data communication protocol;
- determining whether the first cryptographic data communication protocol is registered as unsafe in the gateway device;
- when the first cryptographic data communication protocol is not registered as unsafe in the gateway device, forwarding messages exchanged as part of execution of the first cryptographic data communication protocol between the first and second device; and
- when the first cryptographic data communication protocol is registered as unsafe in the gateway device, executing the first cryptographic data communication protocol between the first device and the gateway device, and executing a second cryptographic data communication protocol, which is not recorded as unsafe in the gateway device, between the gateway and the second device, whereby the first and second cryptographic data communication protocol are executed sequentially to communicate data between the first and second device via the gateway. For example, the protocols may be executed sequentially by means of pipe-lining, e.g. by encrypting messages in the gateway when the gateway decrypts subsequent messages. The first and second cryptographic data communication protocol may in turn be composite protocols.

Alternatively, instead of determining whether the first cryptographic data communication protocol is registered as unsafe, the method may determine whether the first cryptographic data communication protocol is registered as safe in the gateway device. In that alternative, said forwarding is used when the first cryptographic data communication protocol is registered as safe in the gateway device. Furthermore in that alternative, when the first cryptographic data communication protocol is not registered as safe in the gateway device, the first cryptographic data communication protocol is executed between the first device and the gateway device, and the second cryptographic data communication protocol is executed between the gateway device and the second device.

Since the gateway is configured to perform the step of determining whether the first cryptographic data communication protocol is registered as unsafe or to determine whether the first cryptographic data communication protocol is registered as safe in the gateway device, this determination may be performed autonomously from control of the communication by the first or second device.

In this way it can be ensured that the part of the communication between the gateway and the second device, which may take place over the Internet for example is more safe than the part of the communication between the first device and the gateway, which may take place in a local network that is secured by for example physical access limitations. In particular, this makes it possible to avoid use of quantum unsafe cryptographic data communication in non-local networks, such as communication that can be decrypted by using keys that can be derived by prime factorization or discrete logs. It should be noted that a protocol need not be recorded as unsafe merely because it comprises an unsafe sub-protocol. The safety refers to the protocol as a whole: a protocol that is a combination of sub-protocols, such as a sequence of successively executed sub-protocols, can be safe already if one of its sub-protocols is safe.

Preferably, the method is applied at least to communication initiated by the first device for which the first device uses a cryptographic protocol, but it may also be applied to plain text communication initiated by the first device.

It should be noted that the gateway does not just transcribe the communication between arbitrary different formats, but between different cryptographic protocols, specifically applying a second cryptographic data communication protocol that is not registered as unsafe and/or registered as safe in the gateway device. The decision is based on that registration.

In an embodiment the first and second device may be capable of encryption and decryption according to the second cryptographic data communication protocol. In this case, the gateway will enforce use of the second cryptographic data communication protocol even in cases where the first and second device have opted not to use the second cryptographic data communication protocol for the communication.

In an embodiment the communication request from the first device indicates a plurality of alternative cryptographic data communication protocols, including the first cryptographic data communication protocols, and the gateway device
- executes the first cryptographic data communication protocol between the first device and the gateway device in combination with the second cryptographic data communication protocol only when the communication request from the first device to the second device indicates only cryptographic data communication protocols that are registered as unsafe;
- forwards the communication request from the first device to the second device when the communication request indicated only cryptographic data communication protocols that are not registered as unsafe,
- transmits a first further communication request to the second device when the communication request from the first device indicates at least one cryptographic data communication protocols that is not registered as unsafe, leaving cryptographic data communication protocols that are registered as unsafe out of the further communication request.

In this way safety is made possible without requiring that the gateway encrypts and decrypts if the first device offers a choice including safe protocols.

BRIEF DESCRIPTION OF THE DRAWING

These and other objects and advantageous aspects will become apparent from a description of detailed embodiments, with reference to the following figures.

FIG. 3 shows a flow-chart of operation of a gateway

DETAILED DESCRIPTION OF EXEMPLARY EMBODIMENTS

Figure 1:
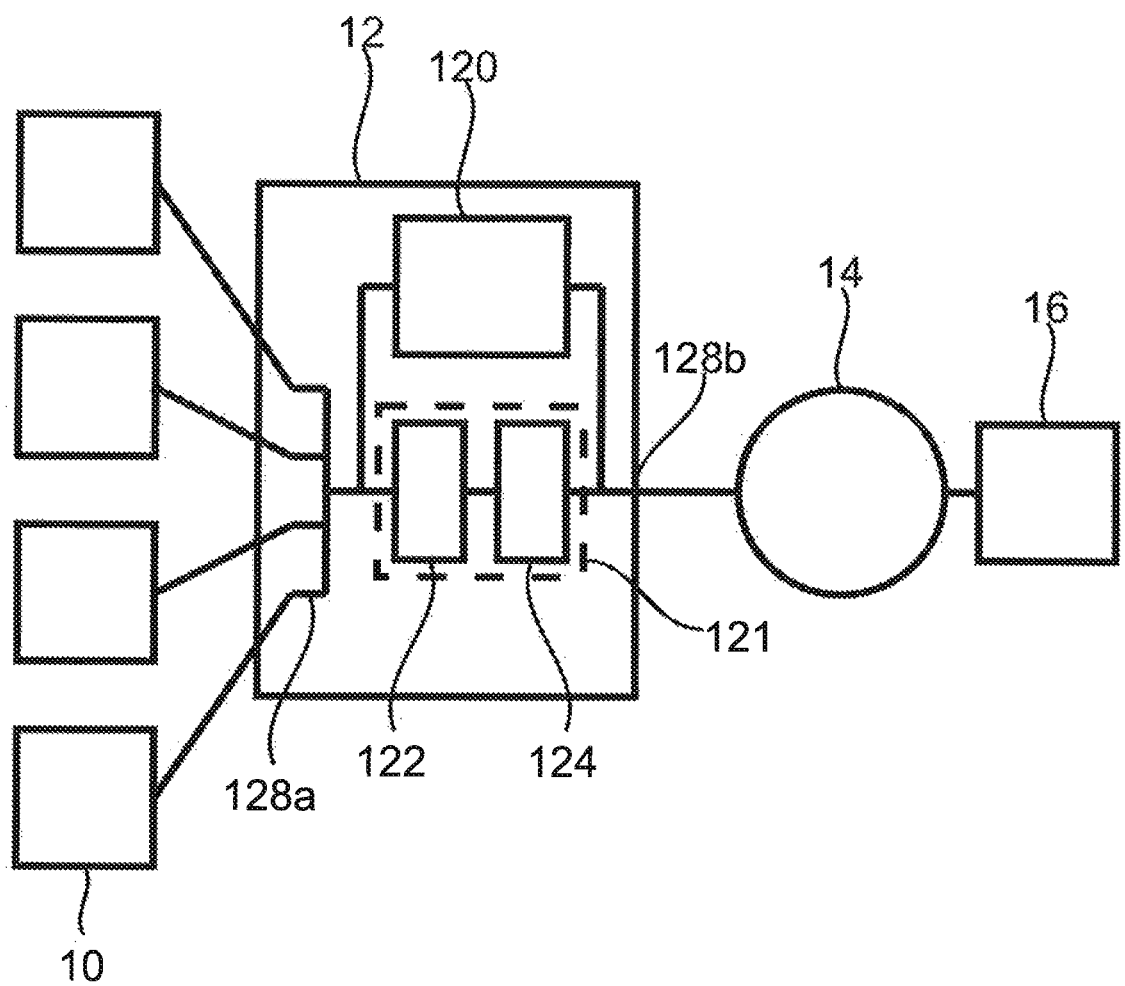
FIG. 1 shows communication system

FIG. 1 shows a communication system comprising a plurality of client devices 10, a gateway 12, a communication medium 14 and a server 16. Client devices 10 are coupled to communication medium 14 via gateway 12. Gateway 12 and server 16 are coupled via communication medium 14. Examples will be described wherein communication medium 14 is a network 14, such as the Internet. Gateway 12 comprises a control processor 120, and a cryptographic processor 121 and ports 128a,b for communication with the client devices 10 and via network 14 respectively.

In an embodiment gateway 12 is a localized device, with all of its components at the same location and used by gateway 12 only. The functions of control processor 120 and cryptographic processor 121 may be performed by the same computer in gateway 12 by executing different programs of instructions of in gateway 12. In an alternative embodiment, gateway 12 may be a distributed device, and/or a device with components that also perform other functions than those of gateway 12. For example part or all of control processor 120 may be located distant from cryptographic processor 121. For example, part of gateway 12 may include a further server distant from cryptographic processor 121, the further server performing some or all of the functions of control processor 120 as described in the following. However, gateway 12 is distinct from client devices 10 and server 16.

Although embodiments will be described that involve client-server communication, it should be understood that the same applies to communication between any type of devices.

In the illustrated embodiment cryptographic processor 121 comprises a first and second crypto devices 122, 124, for decrypting and/or encrypting data at the first and second port respectively. As used herein a crypto device is an encryption device and/or a decryption device, or a device configured to perform operations that are part of a cryptographic data communication protocol. As used herein, a cryptographic data communication protocol comprises operations to encrypt and decrypt data and optionally operations to establish one or more cryptographic keys for use in the encryption and/or decryption of the data.

Figure 2:
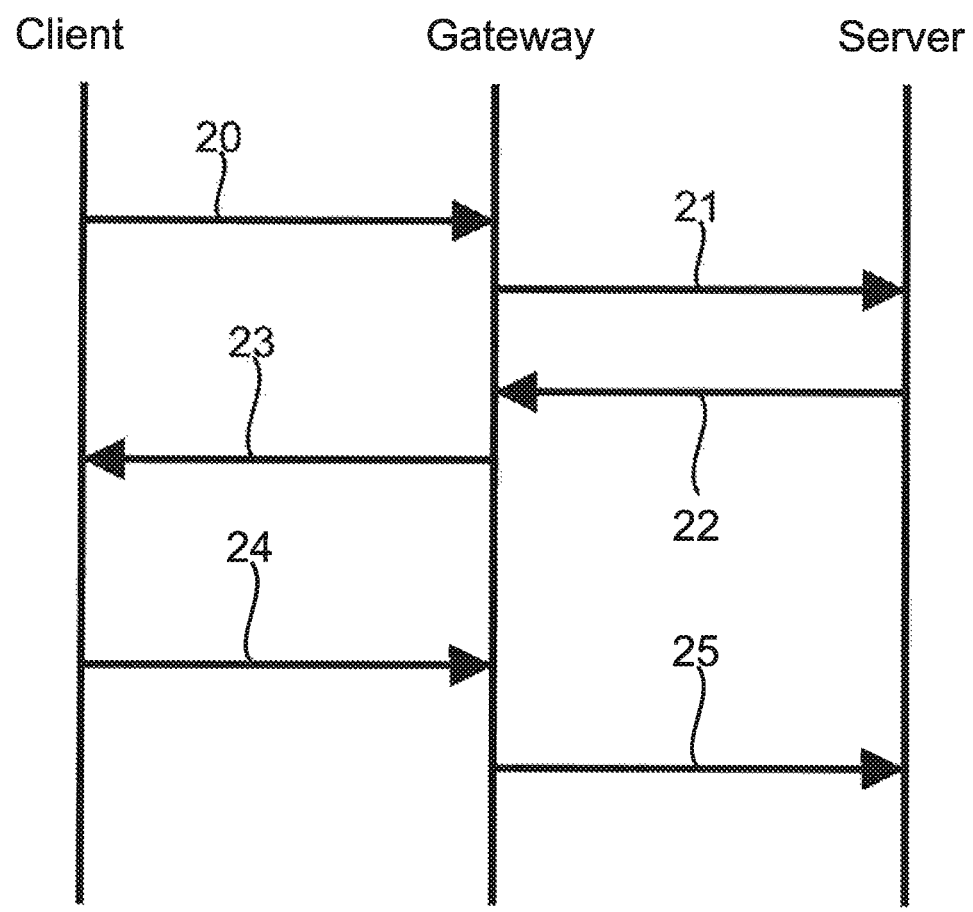
FIG. 2, 2a show communication diagrams

FIG. 2 shows communication during a client-server session. Vertical lines symbolize one of the client devices 10, gateway 12 and server 16. Initially, one of the client devices 10 sends a first communication request 20 for communication that contains a first list of indications of cryptographic data communication protocols to server 16.

FIG. 3 shows a flow chart of the operation of gateway 12. In a first step 31 control processor 120 of gateway 12 intercepts the first communication request. In a second step 32 control processor 120 checks whether the first list contains cryptographic data communication protocols that are recorded as quantum unsafe in control processor 120. Control processor 120 comprises a record of cryptographic data communication protocols that are recorded to be quantum unsafe for use in this check. For example this record contains cryptographic data communication protocols of a type such as asymmetric RSA cryptographic data communication protocols, which allow decryption using a key that can be determined by determining the prime factors that make up a given number N.

In another embodiment, checking whether the first list contains cryptographic data communication protocols that are recorded as quantum unsafe comprises determining whether the key size of the cryptographic data communication protocols in the list exceed a predetermined threshold value. This may be done selectively for symmetric cryptographic data communication protocols for example.

In another, or further, embodiment the record of cryptographic data communication protocols that involve use of random number generation. When it is not known what type of random generator is used by a device 10, it may not be possible to determine whether such a protocol is quantum safe.

In a further embodiment, a device 10 may be configured to provide further information indicating the type of the random generator that will be used in the protocol, and gateway 12 may comprise a further record indicating which type of random generator are quantum safe. In this embodiment second step 32 may comprise that control processor 120 checks whether the indicated random generator is in the further record to determine whether the cryptographic data communication protocols in the first list are quantum safe. Alternatively, gateway may comprise a predetermined list of indications of random generators used for different cryptographic data communication protocols by devices 10, for use in this test. However, such embodiments may require adaption of devices 10 to use of gateway. If such adaptions are not made, safety can be provided by treating cryptographic data communication protocols that involve use of random number generation as unsafe for the purposes of the described method.

Figure 2A:
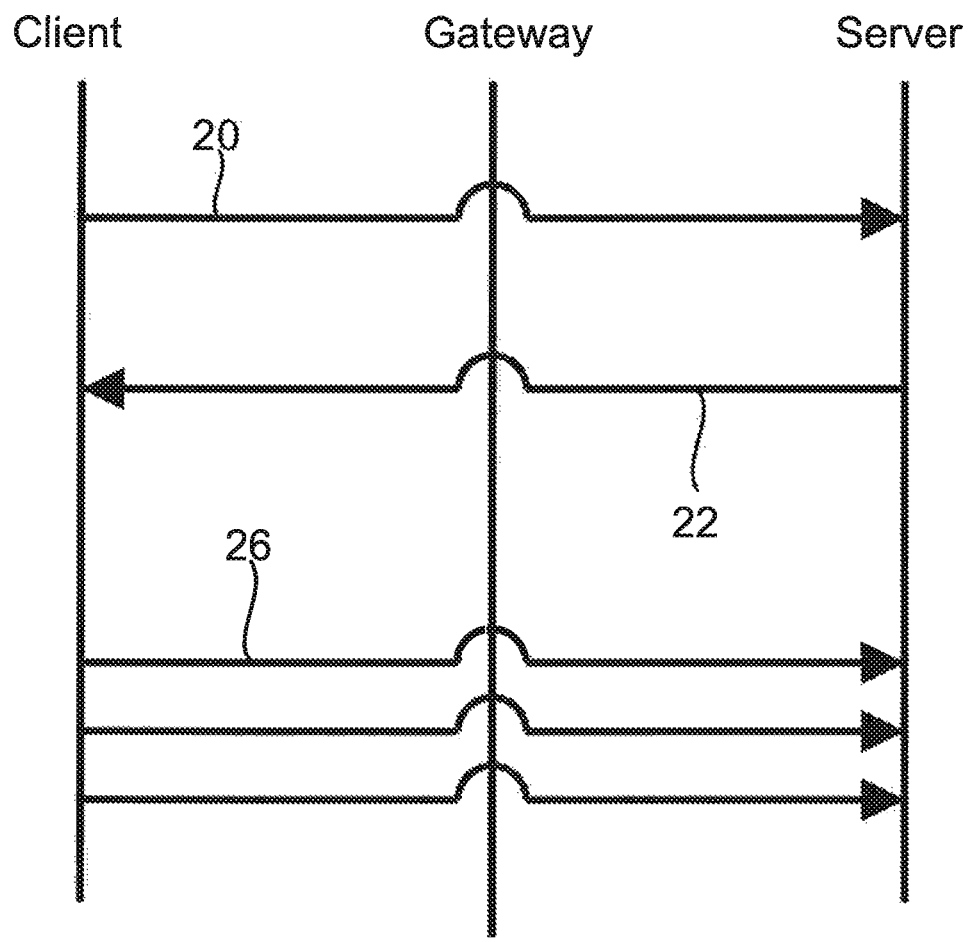

When none of the cryptographic data communication protocols on the first list is recorded as quantum unsafe in control processor 120, gateway 14 executes a third step 33 wherein control processor 120 forwards the first communication request 20 to server 16 (cf. FIG. 2a). When, in a fourth step 34, control processor 120 determines that some, but not all, cryptographic data communication protocols on the first list are recorded as quantum unsafe in control processor 120, gateway executes a fifth step 35 wherein control processor 120 passes a communication request with a reduced first list, retaining only the cryptographic data communication protocols from the first list that are not recorded as quantum unsafe in control processor 120. In this case the communication request that is passed may be a new request, generated in gateway, or a modified version of the communication request. In the latter case, the modification involves removing the unsafe protocols, and possibly also modifying further information, such as checksums and/or cryptographic signatures that may be needed to authenticate the request.

When all cryptographic data communication protocols in the first list are recorded as quantum unsafe in control processor 120, gateway executes a sixth step 36 wherein control processor 120 generates a new communication request containing a new, second list of indications of cryptographic data communication protocols, selected by control processor 120. This new list contains no cryptographic data communication protocols that are recorded as quantum unsafe in control processor 120. Instead the list may contain cryptographic data communication protocols that rely on code based cryptography, lattice-based cryptography, hash-based cryptography, multivariate cryptography and/or cryptography based on super-singular isogenies.

In a seventh step 37, control processor 120 transmits a communication request 21 with the second list to server 16. Server 16 receives this communication request and responds to the received communication request by selecting a cryptographic data communication protocol from the list in the received communication request and transmitting a message 22 containing an indication of the selected cryptographic data communication protocol and optionally information for determining a first key to be used.

In response to the message 22 from server 16, gateway 12 executes an eight step 38 wherein gateway 12 receives the indication of the cryptographic data communication protocol, sets the cryptographic data communication protocol accordingly and determines the first key to be used. The determination of the first key may involve a number of further message exchanges between gateway 12 and server 16. But for the sake of simplicity an embodiment is shown wherein only message 22 suffices.

Subsequently gateway 12 executes a ninth step 39 wherein gateway 12 selects a cryptographic data communication protocol from the original list received in the first communication request from client device 10 and a second key for use in that cryptographic data communication protocol. For example, in the case where encryption according to the selected cryptographic data communication protocol involves raising an encrypted data word to a power k modulo N, where k is a number used as the second key. Gateway 12 sends a further message 23 containing an indication of the selected cryptographic data communication protocol and the second key to the client that has sent the first request. Gateway 12 may receive first communication request 20 and transmit further message 23 as part of a handshake protocol.

When gateway 12 has executed third step 33 or fifth step 35, i.e. when gateway 12 has forwarded the first list or the reduced first list to server 16, server 16 also transmits a message 22 to gateway 12 (cf. FIG. 2a), the message 22 containing an indication of the selected cryptographic data communication protocol For reference, the selected protocol will be referred to as the "third protocol, although of course no first and second protocol need to be selected in this case. In this case gateway 12 forwards that message 22 to client device 10 and receives and forwards information to determine a key to be used for communicating between client device 10 and server 16 (cf. FIG. 2a). This key will be referred to as a third key, although of course no first and second key need to be used in this case.

The determination of the key to be used for communication between client device 10 and server 16 may involve forwarding a number of further message exchanges between client device 10 and server 16. But dependent on the protocol, forwarding the message from server 16 may suffice.

Subsequently client device 10 transmits data 24 encrypted using the selected cryptographic data communication protocol and the second or third key to gateway 12. In the case wherein ninth step 39 has been executed, client device 10 uses the second protocol and the second key. In the case wherein third step 33 or fifth step 35 have been executed client device uses the third protocol and the third key.

In the case wherein server 16 has selected a cryptographic data communication protocol provided by control processor 120, first crypto device 122 decrypts data 24 using the cryptographic data communication protocol indicated to the client device 10 and second crypto device 122 re-encrypts the decrypted data using the cryptographic data communication protocol selected by server 16, using the first key received from server 16. Gateway 12 transmits the re-encrypted data 25 to server 16. For example, in the case where decryption of the cryptographic data communication protocol used by client device 10 involves raising an encrypted data word to a power k' modulo N, where k' is a number used as a secret key associated with the second key, first crypto device 122 decrypts the data by raising an encrypted data word to a power k' modulo N. Subsequently second crypto device 122 re-encrypts the decrypted data using a different protocol that does not rely upon raising an encrypted data word to a power defined by the first encryption key. Thus, use of quantum unsafe encryption in the part of the communication between gateway 12 and server 16 is avoided. In an embodiment, the encryption data word size of the cryptographic data communication protocol used between gateway 12 and server 16 may be longer than that used between client device 10 and gateway 12. In this case, the re-encryption may comprise buffering data words from client device 10 in gateway as long as the combination of data words fit in a data word used for encryption used for transmission gateway 12 and server 16. Alternatively, gateway 12 may add padding information to the decrypted information in order to generate data words of the size needed for re-encryption. When the communication session is terminated padded information may be included in the last re-encrypted data.

In the case wherein third step 33 or fifth step 35 have been executed client device uses the third protocol and the third key and gateway simply forwards encrypted messages 24 form client device 10 to server 16 (cf. FIG. 2a) without decryption and re-encryption by gateway 12.

In the described embodiment, control processor 120 either transmits a communication request with the original first list of cryptographic data communication protocols, a reduced first list or a new, second list of cryptographic data communication protocols. If the first list contains only one cryptographic data communication protocol, the either the first list or the second list is transmitted. In an embodiment wherein the first list is always limited to a single cryptographic data communication protocol, control processor 120 need not provide for fourth step 34 and fifth step 35.

In another embodiment, control processor 120 may be configured to add cryptographic data communication protocols to supplement the reduced first list for transmission in fifth step 35. Thus, dependent on which list was sent, the protocol selected by server 16 can be from the first list, the reduced and optionally supplemented first list or the second list. In this case, gateway 12 may proceed from eight step 38 also when gateway has sent a reduced and supplemented first list to server 16, when server 16 has selected one of the supplemented cryptographic data communication protocols. Thus, dependent on which list was sent, the cryptographic data communication protocol can be selected from the first list, a reduced first list or the second list.

In the described embodiment a blacklist is used, that is, a list of protocols that are registered as unsafe. In an alternative embodiment a whitelist may be used, that is, a list of protocols that are registered as safe.

In the whitelist embodiment the operation remains essentially the same as in the described blacklist embodiment, except that in second step 32 control processor 120 checks whether the first list contains cryptographic data communication protocols that are recorded as safe in control processor 120. Control processor 120 comprises a record of cryptographic data communication protocols that are recorded to be safe for use in this check.

In the whitelist alternative, gateway 14 executes third step 33 when all of the cryptographic data communication protocols on the first list are recorded as safe in control processor 120. Gateway executes fifth step 35 when, in fourth step 34, control processor 120 determines that some, but not all, cryptographic data communication protocols on the first list are recorded as safe in control processor 120. Gateway executes sixth step 36 when none of the cryptographic data communication protocols in the first list are recorded as safe in control processor 120. In the whitelist alternative, the new list of sixth step contains only cryptographic data communication protocols that are recorded as safe in control processor 120.

Thus, only encryption that is registered as safe in the part of the communication between gateway 12 and server 16 is used. As in the blacklist alternative, in the whitelist alternative checking whether the first list contains cryptographic data communication protocols that are recorded as safe may comprise determining whether the key size of the cryptographic data communication protocols in the list exceed a predetermined threshold value. This may be done selectively for symmetric cryptographic data communication protocols for example.

In another, or further, embodiment of the whitelist alternative a record may be used of cryptographic data communication protocols that involve use of random number generation. Determining whether such a protocol is safe may depend on whether it is known what type of random generator is used by a device 10, similarly to the blacklist alternative.

Authentication

The process for selecting the protocol(s) and computing the key may advantageously be combined with use of certificates that enable verification of the source of messages 22, 23. In an embodiment server 16 generates a signed certificate containing an indication of the selected protocol and the first key to be used and transmit the certificate to gateway 12 in message 22. In this embodiment, eight step 38 comprises verification of the certificate, by gateway 12, and gateway 12 only transmits an indication of a selected second protocol and a second key when the certificate is verified.

In a further or other embodiment gateway 12 generates a signed local certificate in ninth step 39 containing an indication of the selected second protocol and the second key to be used and transmits the certificate to client device 10 in message 23, preferably only if gateway 12 has verified the certificate from server 16. In this embodiment, client device 10 verifies the local certificate, before transmitting data 24 encrypted using the selected cryptographic data communication protocol to gateway 12.

When control processor 120 has forwarded the first communication request in third step 33, or sent a modified first communication request in fifth step 35, server 16 may also generate a signed certificate. In this case, gateway 12 may pass the signed certificate of server 16 to the client device 10 that transmitted the first communication request. Alternatively, gateway 12 may generate a signed local certificate after third step 33 and fifth step 35, including the indication of the selected protocol and the first key from server 16. Client device 10 verifies the received certificate of the certificate before transmitting data 24 encrypted using the selected cryptographic data communication protocol to gateway 12.

Figure 4:
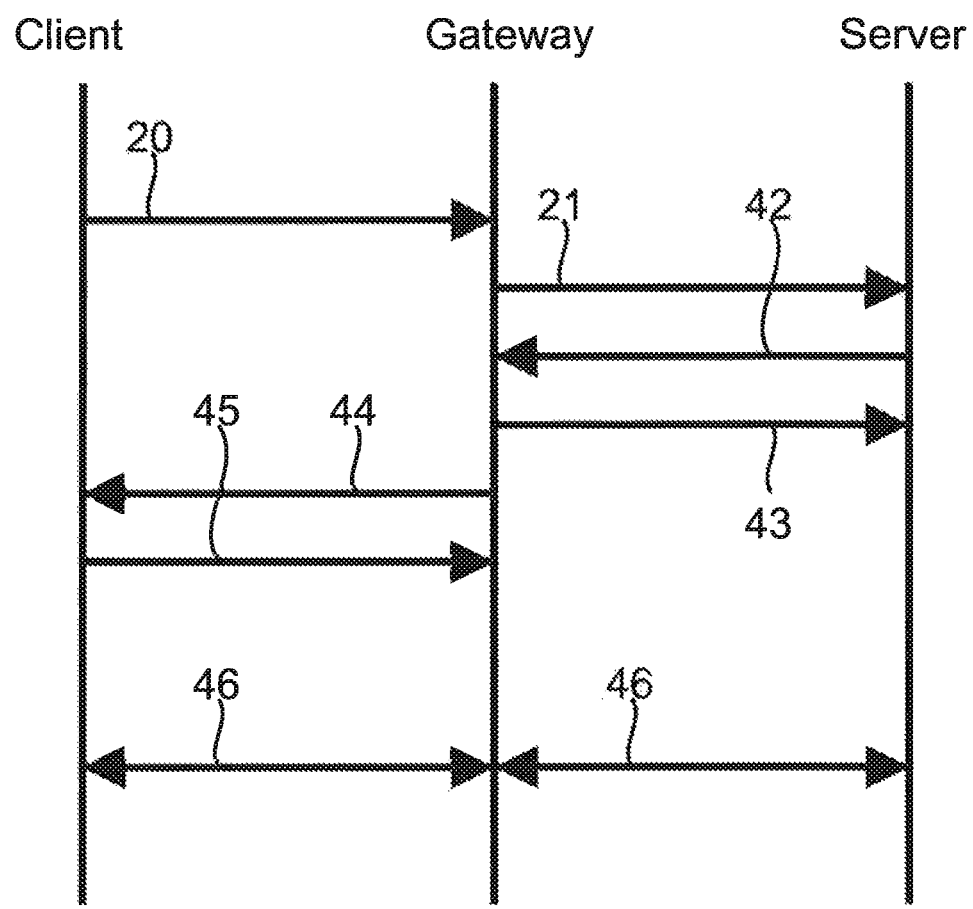
FIG. 4 shows a communication diagram

FIG. 4 shows communication during another embodiment of a client-server session, wherein a first identical key for a first symmetric encryption is established by server 16 and gateway 12 and a second identical key a second symmetric encryption is established by gateway 12 and client device 10. In the prior art, the Diffie-Hellman protocol could be used by client device 10 and server 16 for this purpose, but this protocol is quantum unsafe.

The communication of FIG. 4 is partly similar to that of FIG. 2. One of the client devices 10 initially sends a first communication request 20 for communication that contains a first list of indications of protocols for the establishment of a key for symmetric encryption. If the first list indicates only cryptographic data communication protocols that are indicated as quantum unsafe in the records of gateway 12 (or, in the whitelist alternative, no cryptographic data communication protocols that are indicated as safe), gateway 12 sends a second communication request 21 containing indications of cryptographic data communication protocols that are not indicated as quantum unsafe in the records of gateway 12 (or, in the whitelist alternative, cryptographic data communication protocols that are indicated as safe).

In response server 16 returns a first message 42 to gateway 12, containing an indication of a selected first cryptographic data communication protocol for establishing a first key for first symmetric encryption in gateway 12 and server 16, and optionally data for use in that first cryptographic data communication protocol. Subsequently, gateway 12, using second crypto device 124, and server 16 execute the first cryptographic data communication protocol. In FIG. 4 this is symbolized by a single message 43 from gateway 12 to server 16, but more messages may be involved.

Gateway 12 also returns a second message 44 to client device 10, containing an indication of a selected second cryptographic data communication protocol for establishing a second key for second symmetric encryption in client device 10 and gateway 12, and optionally data for use in that second cryptographic data communication protocol. When the gateway has selected to send second message 44, the selected second cryptographic data communication protocol is not a quantum safe protocol. Subsequently, client device 10 and gateway 12, using first crypto device 122, execute the second cryptographic data communication protocol. In FIG. 4 this is symbolized by a single message 45 from client device 10 to gateway 12, but more messages may be involved. The first and second cryptographic data communication protocol may be performed successively or simultaneously for different messages in a pipelined way. If performed successively, any one may be performed first. Advantageously, the process for selecting the protocol(s) and the key may be combined with use of certificates that enable verification of server 16 and/or gateway. Indications of the selected protocol and key selection information may be included in the certificates. Gateway 12 may delay the second cryptographic data communication protocol until it has verified the certificate of server 16.

After the first and second cryptographic data communication protocol have been executed, symmetrically encrypted messages 46 are exchanged. When server 16 sends an encrypted message, gateway 12 decrypts the message using the first key, re-encrypts the message using the second key and transmits the re-encrypted message to client device 10. Similarly, when client device 10 sends an encrypted message, gateway 12 decrypts the message using the second key, re-encrypts the message using the first key and transmits the re-encrypted message to server 16.

When a protocol from client device 10 that is not quantum unsafe has been selected for the establishment of a key for symmetric encryption (or, in the whitelist alternative, a cryptographic data communication protocols that is registered as safe), gateway 12 forwards encrypted messages 46 between client device 10 and server 16 without decryption and re-encryption.

Although symmetric cryptographic data communication protocols are usually relatively less vulnerable to quantum methods of reconstructing keys, this embodiment uses a first and second keys for server-gateway transmission and gateway-client transmission, because this makes it possible to make key establishment quantum safe against attack on the network 14. The use of longer keys for communication between gateway 12 and server 16 is made possible, even if client device 10 does not support such long keys.

It may be noted that alternatively the cryptographic data communication protocol establishment method of FIGS. 2-3 may be used, after which client device 10 may select a key for symmetric encryption and transmit this key safely using an asymmetric encrypted message.

Similar techniques as discussed with reference to FIG. 1-4 may be used inside server 16, when server contains a further gateway similar to gateway 12 and a server computer that uses quantum unsafe encryption. Furthermore, similar techniques may be used for other cryptographic data communication protocols.

Although embodiments have been disclosed that involve quantum unsafe cryptographic data communication protocols. It should be noted that similar techniques can be used to provide for safer encryption on network 14 than provided by client device 10. For example when client uses keys and/or encryption data words of a first bit size, longer keys and/or encryption data words may be substituted by gateway 12. However, the application to quantum unsafe cryptographic data communication protocols is especially advantageous because client devices 10 may have no way of determining whether its cryptographic data communication protocols have become unsafe due to the availability of quantum computing techniques.

Although embodiments have been disclosed wherein gateway 12 decrypts messages before encryption, it should be noted that instead gateway 12 may apply encryption without preceding decryption. In this case additional measures are needed in server 16, for double decryption or encryption.

The invention claimed is:

1. A method, executed by a gateway device between a first communication network and a second communication network outside the gateway device, for handling communication between a first device in the first communication network and a second device in the second communication network, the method comprising:
    receiving a communication request from the first device, directed to the second device, for performing a first cryptographic data communication protocol;
    determining the first cryptographic data communication protocol is registered as unsafe in the gateway device; and
    executing, in accordance with the determining the first cryptographic data communication protocol is registered as unsafe in the gateway device:
        the first cryptographic data communication protocol between the first device and the gateway device, and
        a second cryptographic data communication protocol, which is not recorded as unsafe in the gateway device, between the gateway device and the second device,
    wherein the first cryptographic data communication protocol and the second cryptographic data communication protocol are executed sequentially to communicate data between the first and second device via the gateway, and
    wherein the first cryptographic data communication protocol registered as unsafe in the gateway device is a cryptographic data communication protocol that is not safe against key reconstruction by a quantum computer.

2. A method, executed by a gateway device between a first communication network and a second communication network outside the gateway device, for handling communication between a first device in the first communication network and a second device in the second communication network, the method comprising:
    receiving a communication request from the first device, directed to the second device, for performing a first cryptographic data communication protocol;
    determining the first cryptographic data communication protocol is registered as unsafe in the gateway device; and
    executing, in accordance with the determining the first cryptographic data communication protocol is registered as unsafe in the gateway device:
        the first cryptographic data communication protocol between the first device and the gateway device, and
        a second cryptographic data communication protocol, which is not recorded as unsafe in the gateway device, between the gateway device and the second device,
    wherein the first cryptographic data communication protocol and the second cryptographic data communication protocol are executed sequentially to communicate data between the first and second device via the gateway, and
    wherein the first cryptographic data communication protocol registered as unsafe in the gateway device is an asymmetric cryptographic protocol requiring mutually different encryption and decryption keys.

3. The method according to claim 2, wherein the asymmetric cryptographic protocol requires raising encryption data words to powers defined by the encryption and decryption keys.

4. The method according to claim 2, wherein the asymmetric cryptographic protocol is based on hidden subgroup problems.

5. A method, executed by a gateway device between a first communication network and a second communication network outside the gateway device, for handling communication between a first device in the first communication network and a second device in the second communication network, the method comprising:
    receiving a communication request from the first device, directed to the second device, for performing a first cryptographic data communication protocol;
    determining the first cryptographic data communication protocol is registered as unsafe in the gateway device; and
    executing, in accordance with the determining the first cryptographic data communication protocol is registered as unsafe in the gateway device:
        the first cryptographic data communication protocol between the first device and the gateway device, and
        a second cryptographic data communication protocol, which is not recorded as unsafe in the gateway device, between the gateway device and the second device,
    wherein the first cryptographic data communication protocol and the second cryptographic data communication protocol are executed sequentially to communicate data between the first and second device via the gateway,
    wherein the first cryptographic data communication protocol registered as unsafe in the gateway device is a data communication protocols that requires determination of a key that serves both for encryption and decryption and raising shared information to secret values to determine the key, and
wherein the key is used in symmetric cryptography.

6. A method, executed by a gateway device between a first communication network and a second communication network outside the gateway device, for handling communication between a first device in the first communication network and a second device in the second communication network, the method comprising:
receiving a communication request from the first device, directed to the second device, for performing a first cryptographic data communication protocol;
determining the first cryptographic data communication protocol is registered as unsafe in the gateway device; and
executing, in accordance with the determining the first cryptographic data communication protocol is registered as unsafe in the gateway device:
the first cryptographic data communication protocol between the first device and the gateway device, and
a second cryptographic data communication protocol, which is not recorded as unsafe in the gateway device, between the gateway device and the second device,
wherein the first cryptographic data communication protocol and the second cryptographic data communication protocol are executed sequentially to communicate data between the first and second device via the gateway, and
the method further comprising:
verifying, by the gateway device, a first signed certificate from the second device containing information for determining a cryptographic key for the second cryptographic data communication protocol;
generating, by the gateway device, a signed second certificate; and
transmitting, by the gateway device, the signed second certificate,
wherein the signed second certificate contains information for determining a cryptographic key for the first cryptographic data communication protocol.

7. A method, executed by a gateway device between a first communication network and a second communication network outside the gateway device, for handling communication between a first device in the first communication network and a second device in the second communication network, the method comprising:
receiving a communication request from the first device, directed to the second device, for performing a first cryptographic data communication protocol;
determining the first cryptographic data communication protocol is registered as unsafe in the gateway device; and
executing, in accordance with the determining the first cryptographic data communication protocol is registered as unsafe in the gateway device:
the first cryptographic data communication protocol between the first device and the gateway device, and
a second cryptographic data communication protocol, which is not recorded as unsafe in the gateway device, between the gateway device and the second device,
wherein the first cryptographic data communication protocol and the second cryptographic data communication protocol are executed sequentially to communicate data between the first and second device via the gateway, and
wherein the communication request from the first device indicates a plurality of alternative cryptographic data communication protocols, including the first cryptographic data communication protocol, and
wherein the gateway device further performs:
executing the first cryptographic data communication protocol between the first device and the gateway device in combination with the second cryptographic data communication protocol in accordance with the communication request from the first device to the second device indicating only cryptographic data communication protocols that are registered as unsafe and/or not registered as safe;
forwarding the communication request from the first device to the second device in accordance with the communication request indicating only cryptographic data communication protocols that are not registered as unsafe and/or registered as safe, and
transmitting a further communication request to the second device in accordance with the communication request from the first device indicating at least one cryptographic data communication protocol that is not registered as unsafe and/or registered as safe, thereby leaving cryptographic data communication protocols that are registered as unsafe and/or not registered as safe out of the further communication request.

8. A communication gateway device, comprising:
a first port and a second port; and
a processor configured to carry out a method including:
receiving a communication request, from a first device at the first port, for performing a first cryptographic data communication protocol, the communication request being directed to a second device that is reachable from the second port,
determining the first cryptographic data communication protocol is registered as unsafe in the gateway device;
executing, in accordance with the determining the first cryptographic data communication protocol is registered as unsafe in the gateway device:
the first cryptographic data communication protocol between the first device and the gateway device, and
a second cryptographic data communication protocol, which is not recorded as unsafe in the gateway device, between the gateway device and the second device,
wherein the first cryptographic data communication protocol and the second cryptographic data communication protocol are executed sequentially to communicate data between the first and second device via the gateway, and
wherein the first cryptographic data communication protocol registered as unsafe in the gateway device is a cryptographic data communication protocol that is not safe against key reconstruction by a quantum computer.

9. A communication gateway device, comprising:
a first port and a second port; and
a control processor configured to carry out a method including:
receiving a communication request from a first device at the first port, for performing a first cryptographic data communication protocol, the communication request being directed to a second device that is reachable from the second port;

determining the first cryptographic data communication protocol is not registered as safe in the gateway device;
executing, in accordance with the determining the first cryptographic data communication protocol is not registered as safe in the gateway device:
the first cryptographic data communication protocol between the first device and the gateway device, and
a second cryptographic data communication protocol, which is not recorded as unsafe in the gateway device, between the gateway device and the second device,
wherein the first cryptographic data communication protocol and the second cryptographic data communication protocol are executed sequentially to communicate data between the first and second device via the gateway,
wherein the communication request from the first device indicates a plurality of alternative cryptographic data communication protocols, including the first cryptographic data communication protocols, and
wherein the gateway device is configured to:
execute the first cryptographic data communication protocol between the first device and the gateway device in combination with the second cryptographic data communication protocol in accordance with the communication request from the first device to the second device indicating only cryptographic data communication protocols that are not registered as safe,
forward the communication request from the first device to the second device in accordance with the communication request indicating only cryptographic data communication protocols that are registered as safe, and
transmit a further communication request to the second device in accordance with the communication request from the first device indicating at least one cryptographic data communication protocol that is registered as safe,
thereby leaving cryptographic data communication protocols that are not registered as safe out of the further communication request.

10. A communication gateway device, comprising:
a first port and a second port; and
a processor configured to carry out a method including:
receiving a communication request, from a first device at the first port, for performing a first cryptographic data communication protocol, the communication request being directed to a second device that is reachable from the second port,
determining the first cryptographic data communication protocol is registered as unsafe in the gateway device;
executing, in accordance with the determining the first cryptographic data communication protocol is registered as unsafe in the gateway device:
the first cryptographic data communication protocol between the first device and the gateway device, and
a second cryptographic data communication protocol, which is not recorded as unsafe in the gateway device, between the gateway device and the second device;
wherein the first cryptographic data communication protocol and the second cryptographic data communication protocol are executed sequentially to communicate data between the first and second device via the gateway,
wherein the gateway device is configured to:
verify a first signed certificate from the second device containing information for determining a cryptographic key for the second cryptographic data communication protocol;
generate a signed second certificate; and
transmit, from the gateway device, the signed second certificate,
wherein the signed second certificate contains information for determining a cryptographic key for the first cryptographic data communication protocol.

11. A communication gateway device, comprising:
a first port and a second port; and
a processor configured to carry out a method including:
receiving a communication request, from a first device at the first port, for performing a first cryptographic data communication protocol, the communication request being directed to a second device that is reachable from the second port,
determining the first cryptographic data communication protocol is registered as unsafe in the gateway device;
executing, in accordance with the determining the first cryptographic data communication protocol is registered as unsafe in the gateway device:
the first cryptographic data communication protocol between the first device and the gateway device, and
a second cryptographic data communication protocol, which is not recorded as unsafe in the gateway device, between the gateway device and the second device;
wherein the first cryptographic data communication protocol and the second cryptographic data communication protocol are executed sequentially to communicate data between the first and second device via the gateway,
wherein the communication request from the first device indicates a plurality of alternative cryptographic data communication protocols, including the first cryptographic data communication protocol, and
wherein the gateway device is configured to:
execute the first cryptographic data communication protocol between the first device and the gateway device in combination with the second cryptographic data communication protocol in accordance with the communication request from the first device to the second device indicating only cryptographic data communication protocols that are registered as unsafe;
forward the communication request from the first device to the second device in accordance with the communication request indicating only cryptographic data communication protocols that are not registered as unsafe; and
transmit a further communication request to the second device in accordance with the communication request from the first device indicating at least one cryptographic data communication protocol that is not registered as unsafe,
thereby leaving cryptographic data communication protocols that are registered as unsafe out of the further communication request.

12. The method of claim 4, wherein the hidden subgroup problems rely on at least one of the group consisting of: a complexity of prime factorization, and a discrete logarithm determination.

\* \* \* \* \*